P. G. NUTTING.
RANGE FINDER.
APPLICATION FILED APR. 11, 1918.
1,317,213.
Patented Sept. 30, 1919.
2 SHEETS—SHEET 2.
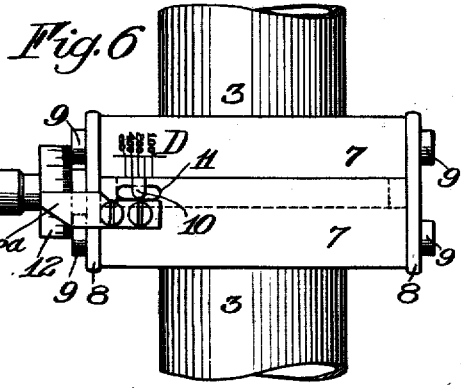
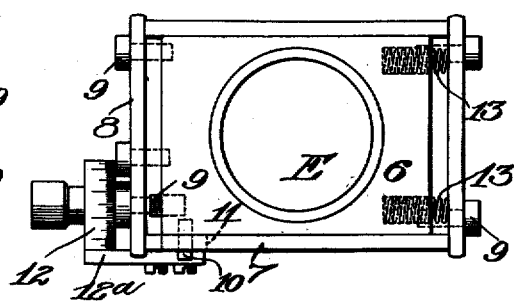
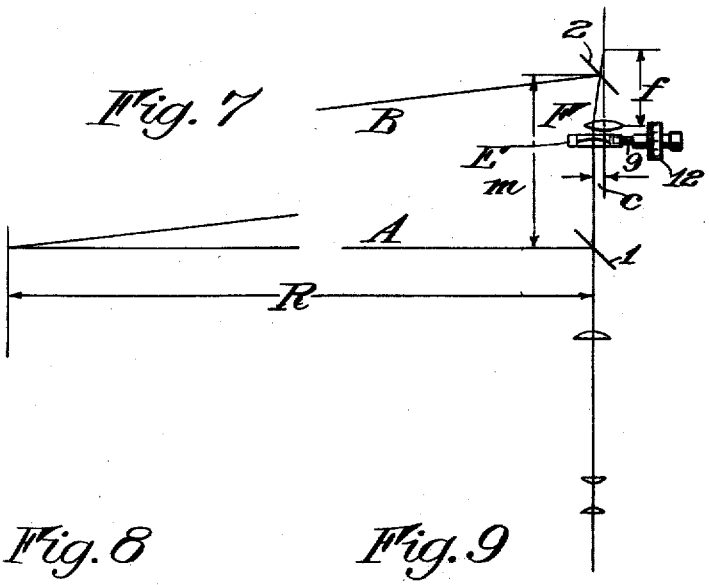
Witnesses
INVENTOR
Perley G. Nutting
BY
his ATTORNEY

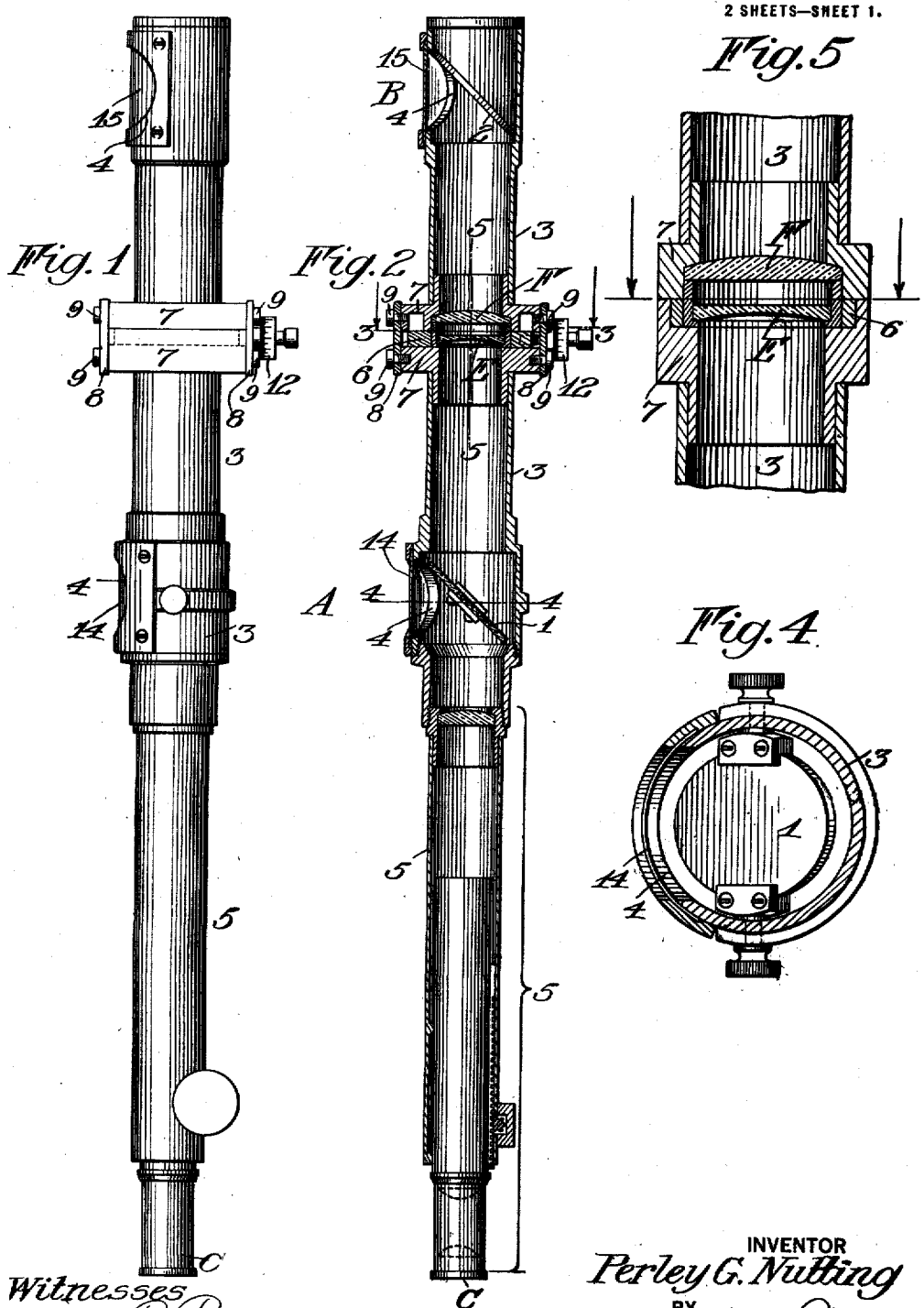

UNITED STATES PATENT OFFICE.

PERLEY G. NUTTING, OF PITTSBURGH, PENNSYLVANIA.

RANGE-FINDER.

1,317,213.  Specification of Letters Patent.  Patented Sept. 30, 1919.

Original application filed May 31, 1916, Serial No. 100,847. Divided and this application filed April 11, 1918. Serial No. 228,043.

*To all whom it may concern:*

Be it known that I, PERLEY G. NUTTING, of Pittsburgh, in the county of Allegheny and State of Pennsylvania, have invented certain new and useful Improvements in Range-Finders; and I do hereby declare the following to be a full, clear, and exact description of the same, reference being had to the accompanying drawings, forming a part of this specification, and to the reference-numerals marked thereon.

My present invention relates to range finders or telemeters for determining the distance of an observed object from the point of observation, and it relates more specifically to that class in which an adjustable member is employed to obtain the coincidence or alinement of two normally non-coincident or unalined images of an observed object, the displacement of the adjustable member when the images are coincident indicating on a scale the range of the object. One of the objects of my invention is to construct such an instrument in which the visibility of the images is increased when required and the certainty and ease of adjustment of the device thereby promoted. To these and other ends the invention resides in certain improvements and combinations of parts all as will be hereinafter more fully described, the novel features being pointed out in the claims at the end of the specification.

In the drawings:

Figure 1 is a side elevation of a range finder constructed in accordance with and illustrating one embodiment of my invention;

Fig. 2 is a longitudinal sectional view thereof;

Fig. 3 is a cross sectional view on the line 3—3 of Fig. 2;

Fig. 4 is a similar view on the line 4—4 of Fig. 2;

Fig. 5 is a fragmentary longitudinal detail sectional view on the line 5—5 of Fig. 2;

Fig. 6 is a fragmentary detail view of the under side of the tube showing the scale for indicating the distance of an object;

Fig. 7 is a diagrammatic view showing the optical system of Figs. 1 and 2;

Fig. 8 is a view showing the images of an object out of alinement as they appear to the observer before adjustment of the instrument, and Fig. 9 is a similar view with the images coincident after adjustment.

Similar reference numerals throughout the several figures indicate the same parts.

This application is a division of my copending application Serial No. 100,847, filed May 31, 1916 and this disclosure will involve an explanation of the range finder described therein though features of the present invention are not necessarily limited in their application to the claimed invention of said parent case.

In carrying out my invention in the present instance, I establish a base line on the distance of separation of two substantially parallel mirrors upon which separate images of the objects are viewed simultaneously from an angle of 45°. One of the mirrors is semi-transparent so that the other mirror can reflect the rays of its image through it and make possible the superpositioning of the images from a common viewpoint. As the angle of incidence of rays from the object is different on the two mirror surfaces, the images will not normally register but an adjustable or variable optical element is utilized to collect the angle of one in accordance with that of the other resulting in the exact register of the two images. The said adjustable element coöperates with a scale and the reading on this scale after the registration of the images has been effected is a true reading of the distance or range of the object from the instrument. A further aid in obtaining this registration is contributed by the use of color screens which produce images of different colors, the lack of registration of which becomes more evident through the color fringing effects that are produced.

Referring more particularly to the drawings, and to Figs. 2 and 7 thereof, 1 and 2 indicate a pair of reflectors spaced from each other within a tube 3 and arranged in parallelism to each other at an angle of approximately 45° to the axis of the tube. Openings 4 are provided in one side of the tube adjacent the reflectors in order to admit relatively angular rays of light A, B from the object to the respective reflectors, Assuming that the rays A are the more direct rays from the image, that is, that their path is normal to the axis of the tube 3, it follows that these rays will be directed by the reflector 1 down the axis of the tube and along the axis of a telescope 5 which forms an extension of the tube and magnifies the size of the image produced by the reflector from the point of observation C which is the eye-piece of the telescope.

The rays A being normal to the axis of the tube, it follows that the rays B emanating from the same object will strike the reflector 2 at a different angle and will be reflected through the tube at a corresponding divergence from the line of the axis thereof and of the rays A after reflection, the angle and divergence being greater with a near object than with a far object.

It being required that the images cast by both reflectors be viewable from the same point of observation, I provide a simple arrangement for permitting the transmission of the rays B to the eye-piece C and it consists in making the reflector 1 semi-transparent by incompletely silvering the back of a glass mirror plate so that it will both transmit and reflect the rays of light. The image formed by the rays B reflected at 2 passes through the mirror 1 and becomes visible at C together with the image formed by the rays A reflected at 1.

Because of the angular direction of the rays B and their deflection within the tube 3 after reflection at 2 as heretofore described, the two images as viewed at C will appear out of register and a double outline of the object will be seen with part of one image overlapping the other. The lack of register will be more pronounced if the object is near than if far away, accordingly as the relative angle of the ray B is greater or less. But in either instance, registration of the two images can be effected by bending the ray or rays B back into alinement with the axis of the tube 3 and with the reflected ray A before the ray B reaches the semi-transparent mirror 1. Further, by utilizing an adjustable element for this purpose and indicating its movement upon a distance scale, a direct reading can be obtained of the distance from the instrument of a given object accordingly as the relative angle of rays A and B emanating therefrom require a greater or less movement of the adjustable element to straighten one ray into alinement with the other after reflection within the instrument.

I produce coincidence of the images by the employment of a deflecting member E which is interposed in the path of the ray B and is movable laterally of the axis of the tube to bend said ray until it coincides in direction with the reflected ray A. The displacement of the member E then indicates the distance of the object on a scale D. In the present instance, the deflecting member E is one of a pair of respectively convex and concave lenses E—F of the same focal length, that work in conjunction with each other and which normally occupy a position with their optical axes in alinement with that of the telescope. The focal lengths of these lenses are coördinated with the distance of separation of the mirrors 1 and 2 and the operation of the pair of compensating lenses is merely that of a wedge of variable angle. The deviation produced by this pair of lenses is dependent upon two factors: (1) the displacement from the coaxial position, and (2) the equivalent focal length of each component. Hence, the focal length of either lens determines and is proportional to the sensibility of the instrument, namely, the displacement required to bring into coincidence two beams of light from a given distant object.

Referring to Fig. 7, assume that the instrument has been sighted on an object at the distance R and that the images register when the lens E has been displaced a distance $c$ from the optical axis. Then since the ray B after reflection from the mirror 2 has a direction toward the focus of the lens F, the following relation holds true:

$$\frac{c}{f} = \frac{m}{R} \text{ or } c = \frac{fm}{R}$$

where $f$ is the focal length of the lens F and $m$ is the distance between the mirrors 1 and 2.

In practice, $f$ is so chosen that $c$ is a distance conveniently measured on a screw (about 1 millimeter), for the range R at which the instrument is intended to operate. For example, if the mirror distance $m=20$ centimeters and the focal length of the deflecting lenses $f=40$ meters, the displacement $c$ necessary for setting on an object at 10,000 meters will be .8 millimeter.

The lens E is carried in a slide 6 movable transversely of the axis of the telescope in guideways formed in blocks 7, secured in juxtaposition by plates 8, fastened at opposite ends of the blocks by screws 9, the blocks being provided with cylindrical reduced portions upon which fit the two opposite portions of the tube 3. The lens F is carried by one of the blocks 7, adjacent the lens E. The slide 6 is moved longitudinally by means of a screw 9 journaled in one of the plates 8 and threaded within the slide. A projection 10 on the slide extends through a slot 11 in the block 7 and coöperates with divisions of a scale D to indicate the distance of the object viewed, the subdivisions being read from graduations on a cylindrical portion 12 on the screw coöperating with an index 12ᵃ on the block 7. Springs 13 interposed between one of the plates 8 and the slide 6 serve to prevent lost motion of the latter.

In the practice of my present invention, in order to enable the images to be seen more distinctly, I provide means for coloring them differently preferably by covering the openings 4 of the tube 3, with differently colored screens. For example, with a blue screen 14 and a yellow screen 15 the respective images 16 and 17 formed by the mirrors 1 and 2 will show blue and yellow except where they overlap, where they will show black, as shown in Figs. 9 and 10 in which the object is a cross. Therefore, colored fringes will show on opposite sides of the images unless the two are in coincidence in which case the whole will show black.

I claim as my invention:

1. A range finder adapted to produce two images of an object movable into coincidence to obtain a distance reading and provided with means for differently coloring the two images.

2. The combination with a range finder adapted to produce two images of an object movable into coincidence to obtain a distance reading, of color filters of different hues arranged to intercept the rays of the respective images as they enter the instrument.

3. In a range finder, the combination with a pair of reflectors for directing rays of light from an object into position to enable an observer to see two separate images of the object, of means for coloring the images differently and means for deflecting the rays of one image to cause coincidence of the images.

PERLEY G. NUTTING.

Witnesses:
GEO. V. MILLIGAN,
SARAH PAUL.

Copies of this patent may be obtained for five cents each, by addressing the "Commissioner of Patents, Washington, D. C."